United States Patent
Marriott

(10) Patent No.: US 6,502,836 B1
(45) Date of Patent: Jan. 7, 2003

(54) CHUCK WITH SPRING LEG DUST COVER

(75) Inventor: Keith Marriott, Clowne (GB)

(73) Assignee: Power Tool Holders Incorporated, Christiana, DE (US)

( * ) Notice: Subject to any disclaimer, the term of this patent is extended or adjusted under 35 U.S.C. 154(b) by 65 days.

(21) Appl. No.: 09/731,086

(22) Filed: Dec. 6, 2000

(51) Int. Cl.$^7$ ............................................. B23B 31/12
(52) U.S. Cl. ........................... 279/61; 279/62; 279/140; 279/902
(58) Field of Search ............................. 279/60–65, 902, 279/140; 408/240

(56) References Cited

U.S. PATENT DOCUMENTS

| | | | |
|---|---|---|---|
| 323,179 A | * | 7/1885 | Mason ........................ 279/61 |
| 1,195,214 A | * | 8/1916 | Gapgood et al. ............. 279/61 |
| 2,458,824 A | * | 1/1949 | Axelsson ..................... 279/64 |
| 2,550,871 A | * | 5/1951 | Sharp ......................... 279/61 |
| 4,094,523 A | | 6/1978 | Derbyshire |
| 5,145,192 A | | 9/1992 | Rohm |
| 5,409,243 A | | 4/1995 | Shadeck et al. |
| 5,431,420 A | | 7/1995 | Huff et al. |
| 5,435,578 A | * | 7/1995 | Rohm ......................... 279/62 |
| 5,465,983 A | | 11/1995 | Owens et al. |
| 5,580,197 A | | 12/1996 | Rohm |
| 5,704,616 A | | 1/1998 | Huff et al. |
| 5,816,582 A | | 10/1998 | Steadings et al. |
| 5,816,583 A | | 10/1998 | Middleton |
| 5,913,524 A | | 6/1999 | Barton |
| 5,957,469 A | * | 9/1999 | Miles et al. .................. 279/62 |
| 5,984,320 A | * | 11/1999 | Nakamura .................... 279/62 |
| 6,007,071 A | | 12/1999 | Middleton |

* cited by examiner

Primary Examiner—Steven C. Bishop
(74) Attorney, Agent, or Firm—Nelson Mullins Riley & Scarborough, LLP

(57) ABSTRACT

A chuck includes a generally cylindrical body having a nose section and a tail section. The tail section is configured to rotate with the drive shaft, and the nose section has an axial bore formed therein. A plurality of jaws are movably disposed with respect to said body toward and away from an axis of the axial bore. A generally cylindrical sleeve is mounted about the body forward of the body tail section and extends rearwardly toward and surrounds the body tail section. A disc is mounted about the body tail section and defines a plurality of radially outward extending flexible tips that engage the sleeve.

17 Claims, 4 Drawing Sheets

CHUCK WITH SPRING LEG DUST COVER

BACKGROUND OF THE INVENTION

The present invention relates generally to chucks for use with drills or electric or pneumatic power drivers. More particularly, the present invention relates to a chuck of the keyless type which may be tightened or loosened by hand.

Both hand and electric or pneumatic tool drivers are well known. Although twist drills are the most common tools used with such drivers, the tools may also comprise screw drivers, nut drivers, burrs, mounted grinding stones, and other cutting or abrading tools. Since the tools may have shanks of varying diameter or may have a polygonal cross-section, the device is usually provided with a chuck that is adjustable over a relatively wide range. The chuck may be attached to a driver by a threaded or tapered bore and may be formed integrally with the drive shaft of the drill.

A wide variety of chucks have been developed in the art. In one form of chuck, three jaws spaced circumferentially approximately 120 degrees apart from each other are constrained by angularly disposed passageways in a body attached to the drive shaft. The chuck is configured so that rotation of the body in one direction with respect to a constrained nut forces the jaws into or away from a gripping relationship with a tool shank. Such a chuck may be keyless if it can be tightened or loosened by manual rotation. An example of such a chuck is disclosed in U.S. Pat. No. 5,816,583, commonly assigned to the present assignee and the entire disclosure of which is incorporated by reference herein.

In another form of chuck, a nut is axially movably disposed about the chuck body so that axial movement of the nut with respect to the chuck body moves the chuck jaws within passageways in the chuck body. The nut defines threads on an outer circumferential surface that mate with threads defined on an inner circumferential surface of a sleeve. Rotation of the sleeve with respect to the chuck body moves the nut axially to drive the jaws within the passageways to grip and ungrip a tool.

Various configurations of keyless chucks are known in the art and are desirable for a variety of applications.

SUMMARY OF THE INVENTION

The present invention recognizes and addresses the foregoing considerations, and others, of prior art construction and methods. Accordingly, it is an object of the present invention to provide an improved chuck for use with a manual or powered driver.

This and other objects are achieved by a chuck for use with a manual or powered driver having a rotatable drive shaft. The chuck includes a generally cylindrical body having a nose section and a tail section. The tail section is configured to rotate with the drive shaft, and the nose section has an axial bore formed therein. A plurality of jaws are movably disposed with respect to said body toward and away from an axis of the axial bore. A generally cylindrical sleeve is mounted about the body forward of the body tail section and extends rearwardly to and at least partially surrounds the body tail section. A disc is mounted about the body tail section and defines a plurality of radially outward extending flexible tips that engage the sleeve.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
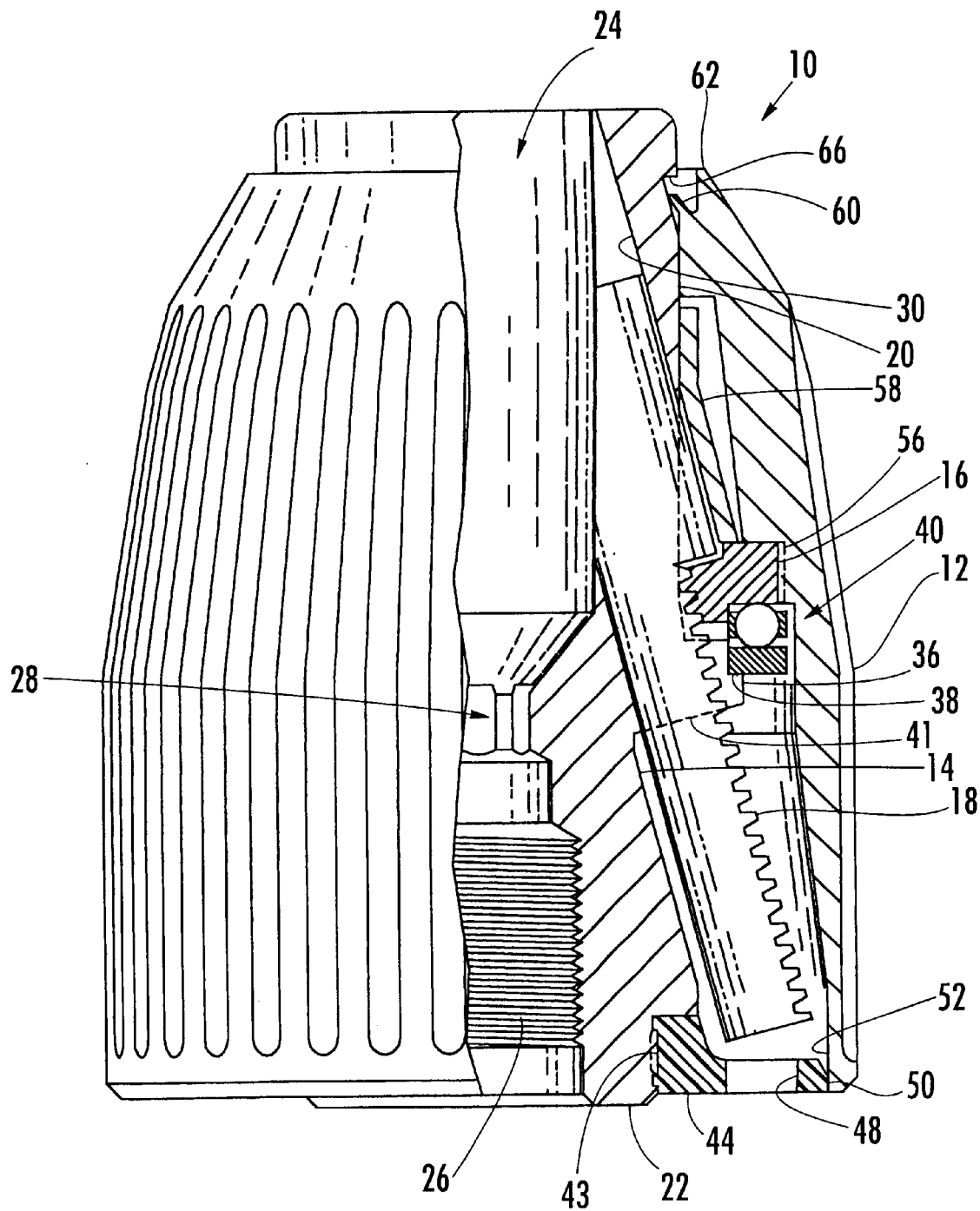
FIG. 1 is a plan view, partly in section, of a chuck constructed in accordance with-an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
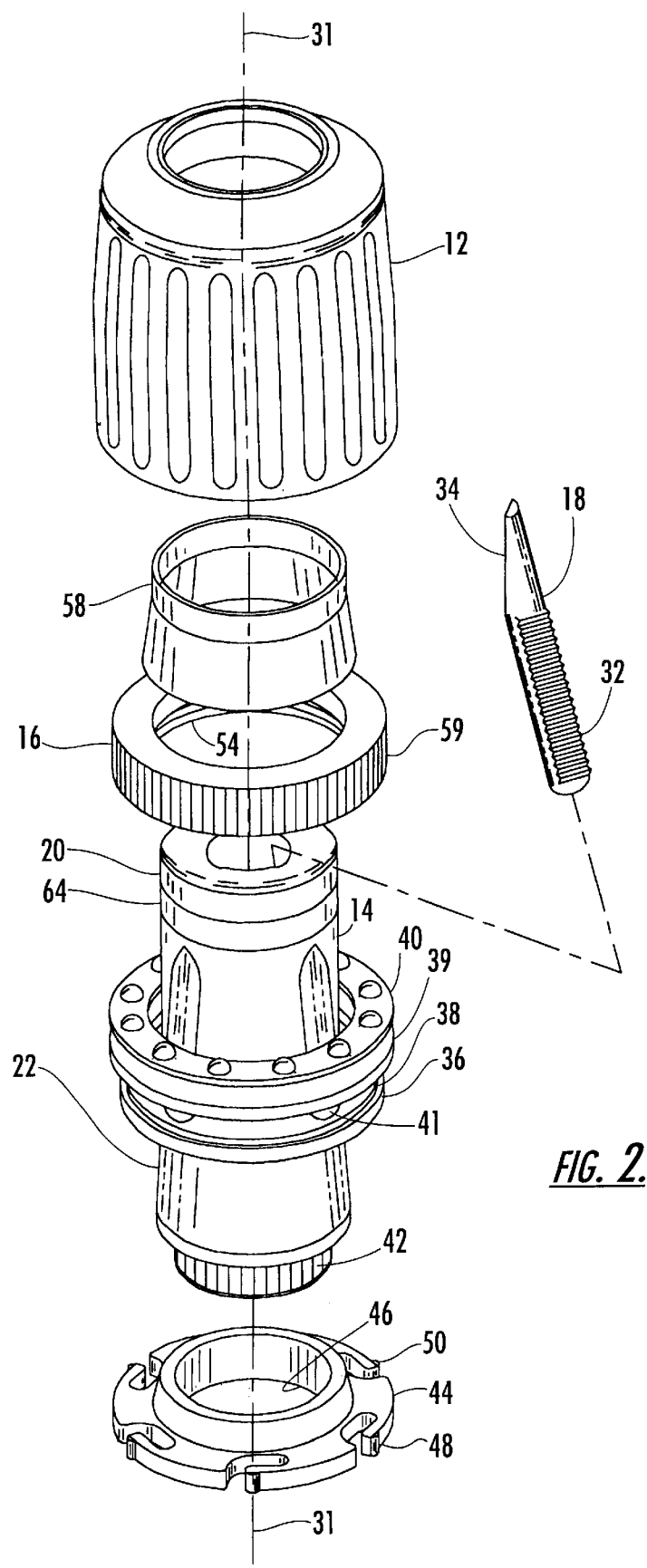
FIG. 2 is an exploded view of the chuck as shown in FIG. 1.

Referring to a preferred embodiment illustrated in FIGS. 1 and 2, a chuck 10 includes a sleeve 12, a body 14, a nut 16, and jaws 18. Body 14 is generally cylindrical in shape and includes a nose or forward section 20 and a tail or rearward section 22. An axial bore 24 is formed in nose section 20 and is somewhat larger than the largest tool shank that the chuck is designed to accommodate. A threaded bore 26 is formed in tail section 22 and is of a standard size to mate with and rotate with the drive shaft of a powered or hand driver (not shown). The bores 24 and 26 may communicate at a central region 28 of body 14. While a threaded bore 26 is described and illustrated, such bore may be replaced with a tapered bore of standard size to mate with a tapered drive shaft. Furthermore, the body may be formed integrally with the drive shaft.

A plurality of passageways 30 are formed in body 14 to accommodate each jaw 18. Preferably, three jaws 18 are employed, and each jaw is separated from the adjacent jaw by an arc of approximately 120 degrees. The axes of passageways 30 and jaws 18 are angled with respect to the chuck axis 31 but intersect the axis at a common point ahead of chuck body 14. Each jaw 18 defines a tool engaging surface 34 proximate an axially forward end of the jaw and threads 32 on its opposite or outer surface proximate an axially rearward end of the jaw. Threads 32 may be constructed in any suitable type and pitch. Tool engaging surface 34 is generally parallel to the axis of axial bore 24, which is axis 31 of body 14.

Body 14 includes a thrust bearing ring 36 which, in a preferred embodiment, may be integral with the body. In an alternate embodiment, thrust ring 36 may be a separate component from the body member. Thrust ring 36 may also include a ledge portion 38 to receive a bearing assembly 40. Thrust bearing ring 36 includes a plurality of jaw guideways 41 formed around the circumference to permit retraction of the jaws 18 therethrough.

Figure 4:
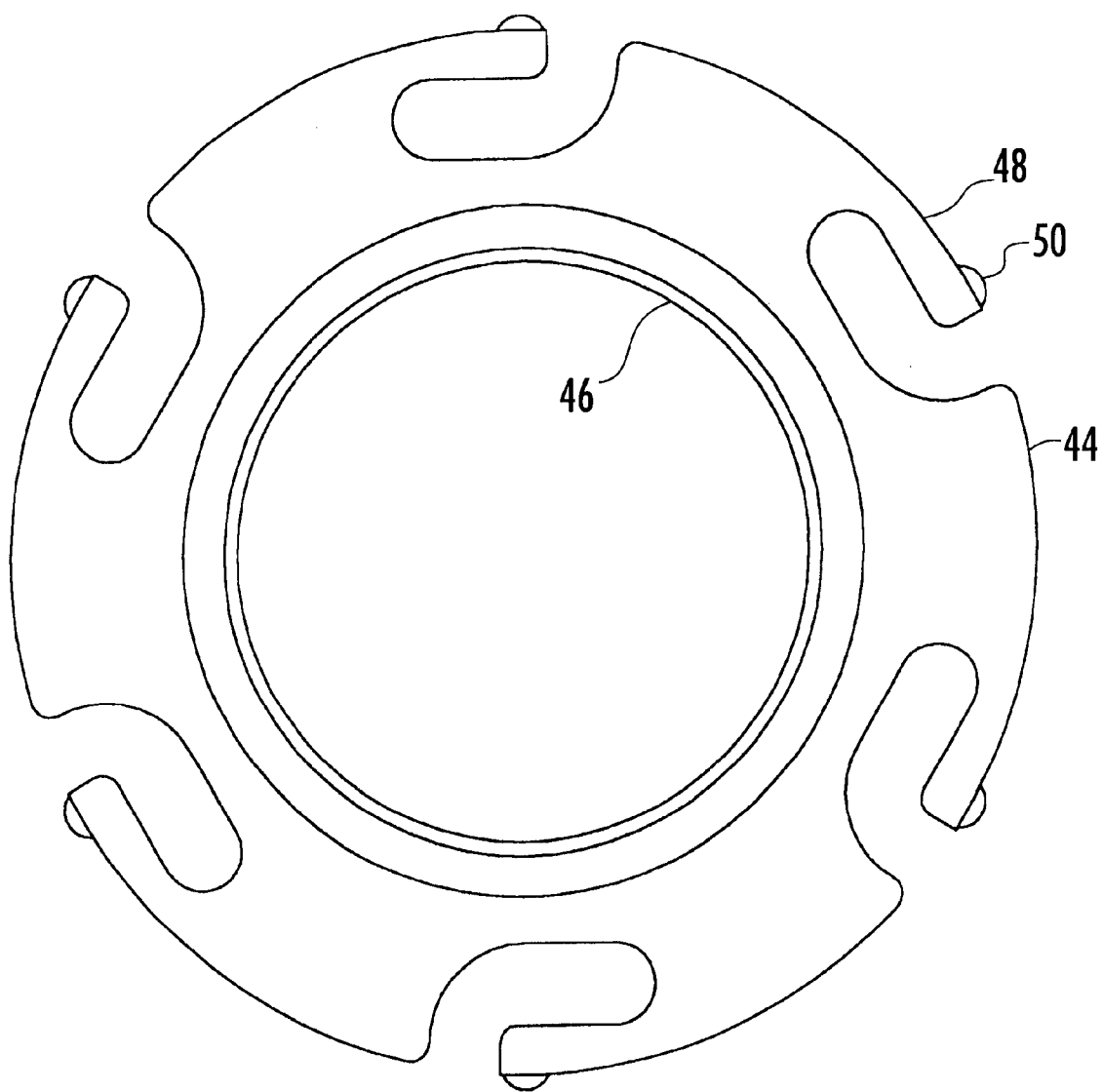
FIG. 4 is a plan view of a disc for use in a chuck in accordance with an embodiment of the present invention.

As illustrated in FIG. 2, body tail section 22 includes a knurled surface 42 for receipt of a disc 44. Referring also to FIG. 4, disc 44 defines an aperture 46 for receipt of body tail section 22, and a plurality of circumferentially extending, radially outward biased leg portions 48, each leg portion including an end portion 50 in engagement with an inner circumferential surface 52 of sleeve 12.

As shown in FIG. 1, disc 44 is press-fit to tail section 22 at 43. It should be appreciated that disc 44 could also be retained in place by press fit without knurling, or by use of a key. It could also be retained in place by crimping, staking, riveting, threading or any other suitable securing mechanism. For example, referring to FIG. 3, disc 44 could be held axially on the chuck body by one or more snap rings fitting into an exterior annular groove on the body tail section.

Referring again to FIGS. 1 and 2, chuck 10 includes a nut 16 which, in a preferred embodiment, is a one piece nut defining a thread 54 for mating with threads 32 on jaws 18. Nut 16 is positioned about the body in engagement with the jaw threads so that when the nut is rotated with respect to body 14, the jaws will be advanced or retracted. Sleeve 12 is press-fit to a knurled outer surface 59 of nut 16 at 56 so that when sleeve 12 is rotated, nut 16 will rotate therewith to move the jaws.

The outer circumferential surface of sleeve 12 may be knurled or may be provided with longitudinal ribs or other protrusions to enable the operator to grip it securely. The sleeve may be fabricated from a structural plastic such as polycarbonate, a filled polypropylene, for example glass filled polypropylene, or a blend of structural plastic materials. Other composite materials such as, for example, graphite filled polymerics would also be suitable in certain environments. As should be appreciated by one skilled in the art, the materials for which the chuck of the present invention is fabricated will depend on the end use of the chuck, and the above are provided by way of example only.

As indicated above, disc 44 is secured to body 14 by the press fit at 43, and sleeve 12 is pressed to nut 16 at 56. Sleeve 12 is axially secured with respect to the body by nut 16 and a retaining ring 58. Retaining ring 58 is an annular cone that is pressed onto body forward section 20 and engages an axially forward facing surface of nut 16.

A secondary retaining mechanism includes an annular lip 60 proximate an open end 62 of sleeve 12. Lip 60 extends radially inward from sleeve 12 and axially forward toward sleeve open end 62. As shown, lip 60 may be unitarily constructed with sleeve 12. The diameter of the opening defined by lip 60 is smaller than the outer diameter of body forward section 20. As the sleeve is mounted onto the body, however, the forward orientation of lip 60 allows the lip to deform as forward section 20 contacts the sloped inner or rearward face of the lip.

A groove 64 is formed in forward section 20 to receive lip 60 when sleeve 12 is secured to the body in its operative position. Groove, 64 forms a ledge 66 which opposes lip 60 when the sleeve is in its operative position. Ledge 66 may be constructed in a number of configurations. For example, it might not necessarily extend completely around the body, possibly defining intermittent gaps. In addition, it is not necessary that it be constructed from a part of the body.

Figure 3:
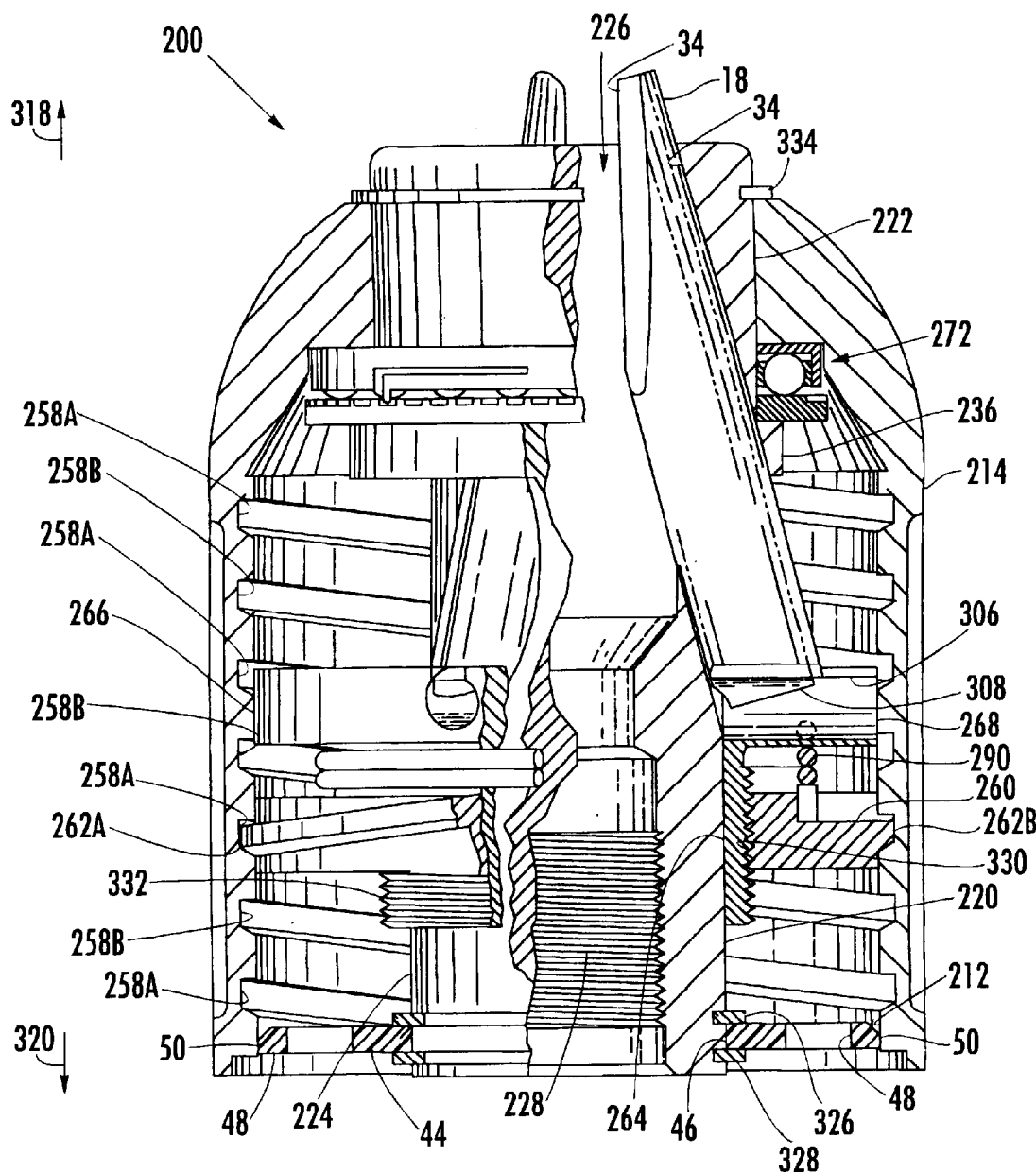
FIG. 3 is a plan view, partly in section, of a chuck constructed in accordance with an embodiment of the present invention.

In another preferred embodiment illustrated in FIG. 3, chuck 200 includes an elongated and generally cylindrical body 220, a sleeve 214, a nut 260, a thrust plate 266, and jaws 18. Body 220 includes a forward or nose section 222 and a rearward or tail section 224. Body 220 includes an axial bore 226 formed in nose section 222 that is somewhat larger than the largest tool shank that the chuck is designed to accommodate. A threaded bore 228 is formed in tail section 224 and is of a standard size to mate and rotate with the drive shaft of a powered or hand driver (not shown). The bores 226 and 228 may communicate at a central region 227 of body 220. While a threaded bore 228 is described and illustrated, such bore may be replaced with a tapered bore of standard size to mate and rotate with a tapered drive shaft. Furthermore, the body may be formed integrally with the drive shaft.

Sleeve 214 extends to the rear of chuck body 220 and forms the chuck's outer circumferential surface. Sleeve 214 is generally cylindrical and defines two female threads 258A and 258B on the sleeve's inner circumferential surface.

Nut 260 and thrust plate 266 are each axially movably disposed about body 220. Nut 260 defines male threads 262A and 262B on an outer circumferential surface, and a thread 330 on an inner circumferential surface. Nut thread 330 engages a thread 332 defined on an outer circumferential surface of a body portion 264 of thrust plate 266. A spring 290 is disposed between nut 260 and a flange portion 268 of thrust plate 266. Flange portion 268 defines a plurality of generally radially inwardly directed bores 306 forward of threads 332.

A plurality of passageways 30 are formed in body 220 to accommodate each jaw 18. Preferably, three jaws 18 are employed, and each jaw is separated from the adjacent jaw by an arc of approximately 120 degrees. The axes of passageways 30 and jaws 18 are angled with respect to the chuck axis but intersect the axis at a common point ahead of chuck body 220. Each jaw 18 defines a tool engaging surface 34 proximate an axially forward end of the jaw that is generally parallel to the axis of axial bore 226.

Each jaw 18 defines an end section 308 at an axially rearward end of the jaw. In this embodiment, jaw end sections 308 are semi-circular in shape to slide within three cylindrical bores 306. Bores 306 may extend entirely through the thrust plate.

These arrangements allow the jaw ends to move radially as the nut moves the jaws between open and closed positions. A dry lubricant coating may be provided at the jaw end and thrust plate bore interface to facilitate this movement. The cooperation between the jaw ends and the thrust plate bores maintains the jaws at the proper angle with respect to the nut so that the jaws are maintained in alignment with the jaw passageways in the assembled chuck. As should be understood by one skilled in the art, other suitable jaw end configurations are contemplated by the present invention. For example, T-shaped jaw ends could fit within correspondingly shaped bores defined in the thrust plate. As should be further understood, the angle between the chuck axis and the direction of the bores may vary to accommodate the particular type of jaw end configuration.

A bearing assembly 272 is disposed between a forward end of sleeve 214 and a body thrust ring 236 defined on body 220 forward of jaw passageways 30. Sleeve 214 is held in the axially forward direction on body 220 by a snap ring 334.

In this embodiment, sleeve threads 258 and nut threads 262 are in an eight-pitch configuration. Threads 330 and 332 are 32-pitch threads. However, it should be understood that any suitable thread arrangement could be used with the present invention.

Disc 44 of the embodiment illustrated in FIG. 3 is axially retained on body 220 by snap rings 326 and 328. Similar to the embodiments illustrated in the other Figures, disc 44 of FIG. 3 includes an aperture 46 for receipt of body tail section 224 and a plurality of circumferentially extending, radially outward biased leg portions 48, each leg portion including an end portion 50 in engagement with an inner circumferential surface 212 of sleeve 214. The disc 44 illustrated in FIG. 3 is generally washer shaped or flat, whereas in the other Figures, the inner portion of disc 44 surrounding aperture 46 protrudes axially in the forward direction. Thus, it should be understood that disc 44 may be shaped and configured in a variety of ways to accommodate the particular body tail section to which it is affixed and the chosen manner of fastening it to the body tail section. It should also be understood that other suitable fastening methods may be employed and that the disc structure may vary to accommodate different front sleeve configurations. For example, the disc could be formed with a gripping surface.

Friction between threads 258 and 262 is normally insufficient to overcome the force of torsion spring 290 keeping the nut and thrust plate together. Accordingly, when chuck 200 is between a fully opened and fully closed position, rotation of sleeve 214 in a clockwise direction (when viewed from the front of chuck 200) drives nut 260 axially forward with respect to sleeve 214 and body 220 in direction 318. Nut 260 is axially held to thrust plate 266 by threads 330 and 332. Thus, movement of nut 260 in direction 318 also moves thrust plate 266, thereby moving jaws 18 in passageways 30 toward the chuck axis.

When the jaws clamp onto a tool, they exert a rearward force to sleeve 214 through thrust plate 266 and nut 260. Continued rotation of sleeve 214 wedges threads 258 and 262. Although a wedge also develops between threads 330 and 332, the rotational force applied to the nut by sleeve 214 is greater than the resistance provided by threads 330 and 332, due to the much lower pitch of threads 258 and 262. The rotational force also overcomes the resistance of spring 290 (about 5 to 10 inch-lbs). Thus, nut 260 begins rotating with the sleeve on threads 332 against spring 290.

Threads 330 have the same orientation as threads 258, and threads 332 have the same orientation as threads 262. Thus, rotation of nut 260 with sleeve 214 in the closing direction rotates the nut on threads 332 so that the nut and thrust plate move axially apart from each other. Since bearing assembly 272 and the body thrust ring prevent the sleeve and nut from moving rearwardly, this rotation forces thrust plate 266 axially forward, thereby further pressing jaws 18 down onto the tool shank. Continued rotation wedges threads 330 and 332. This wedge overcomes the force of torsion spring 290 so that, when an operator releases the sleeve, the chuck remains in the fully tightened position.

To open the chuck, the operator rotates sleeve 214 in the opening direction (counterclockwise) of chuck 200. This rotates nut 260 in the opening direction with respect to thrust plate 266, moving thrust plate 266, and therefore jaws 18, axially away from the tool shank. When the nut returns to its original rotational position on the thrust plate, further rotation of sleeve 214 moves the nut, thrust plate and jaws axially rearward, away from the tool.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore it is contemplated that any and all such embodiments are included in the present invention as may fall within the literal and equivalent scope of the appended claims.

What is claimed is:

1. A chuck for use with a manual or powered driver having a rotatable drive shaft, said chuck comprising:
   a generally cylindrical body having a nose section and a tail section, said tail section being configured to rotate with the drive shaft and said nose section having an axial bore formed therein;
   a plurality of jaws movably disposed with respect to said body toward and away from an axis of said axial bore;
   a generally cylindrical sleeve mounted about said body forward of said tail section, said sleeve extending rearwardly to and at least partially surrounding said tail section; and
   a disc mounted about said body tail section, said disc defining a plurality of radially outward biased flexible tips in engagement with said sleeve, wherein a rear surface of said disc is located generally at the rear end of said tail section and said flexible tips. are biased radially outward so that said flexible tips are continuously in contact with said sleeve as said jaws move toward and away from said axis of said axial bore.

2. The chuck as in claim 1, including a nut mounted about said body and configured so that rotation of said nut with respect to at least one of said body and said sleeve causes said jaws to move with respect to said body.

3. The chuck as in claim 1, wherein said body nose section includes a plurality of angularly disposed passageways formed therethrough and intersecting said axial bore and wherein said jaws are disposed in respective said passageways.

4. The chuck as in claim 2, wherein said nut is axially movably disposed about said body and is in driving engagement with said jaws so that axial movement of said nut with respect to said body moves said jaws toward and away from an axis of said axial bore.

5. The chuck as in claim 4, wherein said nut defines a thread on an outer circumferential surface of said nut and wherein said sleeve defines a thread on an inner circumferential surface that engages said nut thread so that relative rotation between said nut and said sleeve moves said nut axially with respect to said body.

6. The chuck as in claim 5, including a thrust plate disposed between said nut and said jaws in axially driving engagement with said jaws.

7. The chuck as in claim 3, including a nut rotatably mounted about said body in driving engagement with said jaws so that rotational movement of said nut with respect to said body moves said jaws axially in said passageways.

8. The chuck as in claim 7, wherein said nut is axially fixed with respect to said body.

9. The chuck as in claim 7, wherein said nut defines threads on an inner circumferential surface of said nut.

10. The chuck as in claim 1, wherein said flexible tips extend outward from an outer circumferential surface of said disc.

11. The chuck as in claim 1, including a snap ring fixed to said body tail section to hold said disc against one of rearward and forward axial movement with respect to said body.

12. The chuck as in claim 11, wherein said snap ring is disposed axially forward of said disc and a second snap ring is disposed axially rearward of said disc.

13. The chuck as in claim 11, wherein said snap ring engages a radial recess in said body tail section.

14. The chuck as in claim 1, wherein said flexible tips include a circumferentially extending leg portion.

15. The chuck as in claim 14, wherein each said leg portion defines a radially outward extending end portion.

16. The chuck as in claim 1, wherein a forward section of said sleeve includes a generally cylindrical radially inward facing surface received by a generally cylindrical radially outward facing surface on said body nose section.

17. The chuck as in claim 1, wherein said sleeve extends beyond said jaws in the axially rearward direction to engage said flexible tips on said disc.

* * * * *